United States Patent
Jeschke

(10) Patent No.: US 6,703,977 B2
(45) Date of Patent: Mar. 9, 2004

(54) METHOD OF OPERATING A RADIO-BASED COMMUNICATIONS SYSTEM

(75) Inventor: Michael Jeschke, Stuttgart (DE)

(73) Assignee: Alcatel, Paris (FR)

(*) Notice: Subject to any disclaimer, the term of this patent is extended or adjusted under 35 U.S.C. 154(b) by 147 days.

(21) Appl. No.: 10/090,750

(22) Filed: Mar. 6, 2002

(65) Prior Publication Data

US 2002/0140603 A1 Oct. 3, 2002

(30) Foreign Application Priority Data

Mar. 31, 2001 (DE) .......................... 101 16 170

(51) Int. Cl.⁷ .............................. G01S 3/16; H04B 1/69

(52) U.S. Cl. .................... 342/378; 375/144; 375/148

(58) Field of Search .................... 342/378; 375/144, 375/148, 267, 347, 349; 455/506, 137–141, 273

(56) References Cited

U.S. PATENT DOCUMENTS 6,064,338 A * 5/2000 Kobayakawa et al. ...... 342/378
2003/0012267 A1 * 1/2003 Jitsukawa et al. .......... 375/148

FOREIGN PATENT DOCUMENTS

WO    WO 01/67627 A1 * 9/2001 ........... H04B/1/707

* cited by examiner

Primary Examiner—Thomas H. Tarcza
Assistant Examiner—F H Mull
(74) Attorney, Agent, or Firm—Sughrue Mion, PLLC

(57) ABSTRACT

A method of operating a radio-based communications system is described. Signals from a plurality of mobile stations can be received by a plurality of antennae (11) of a base station (10). Profiles of the received signals can be calculated by a plurality of path-profiler-units (12). Specified individual values can be selected from the calculated profiles by a path-selector-unit (14). A plurality of rake-finger-units (16) can be assigned to the arrival times of the selected individual values. A predetermined number of path-profiler-units (12) are provided which can be distributed with the aid of a path-profiler-manager (13) between the plurality of antennae (11) and the plurality of mobile stations.

18 Claims, 1 Drawing Sheet

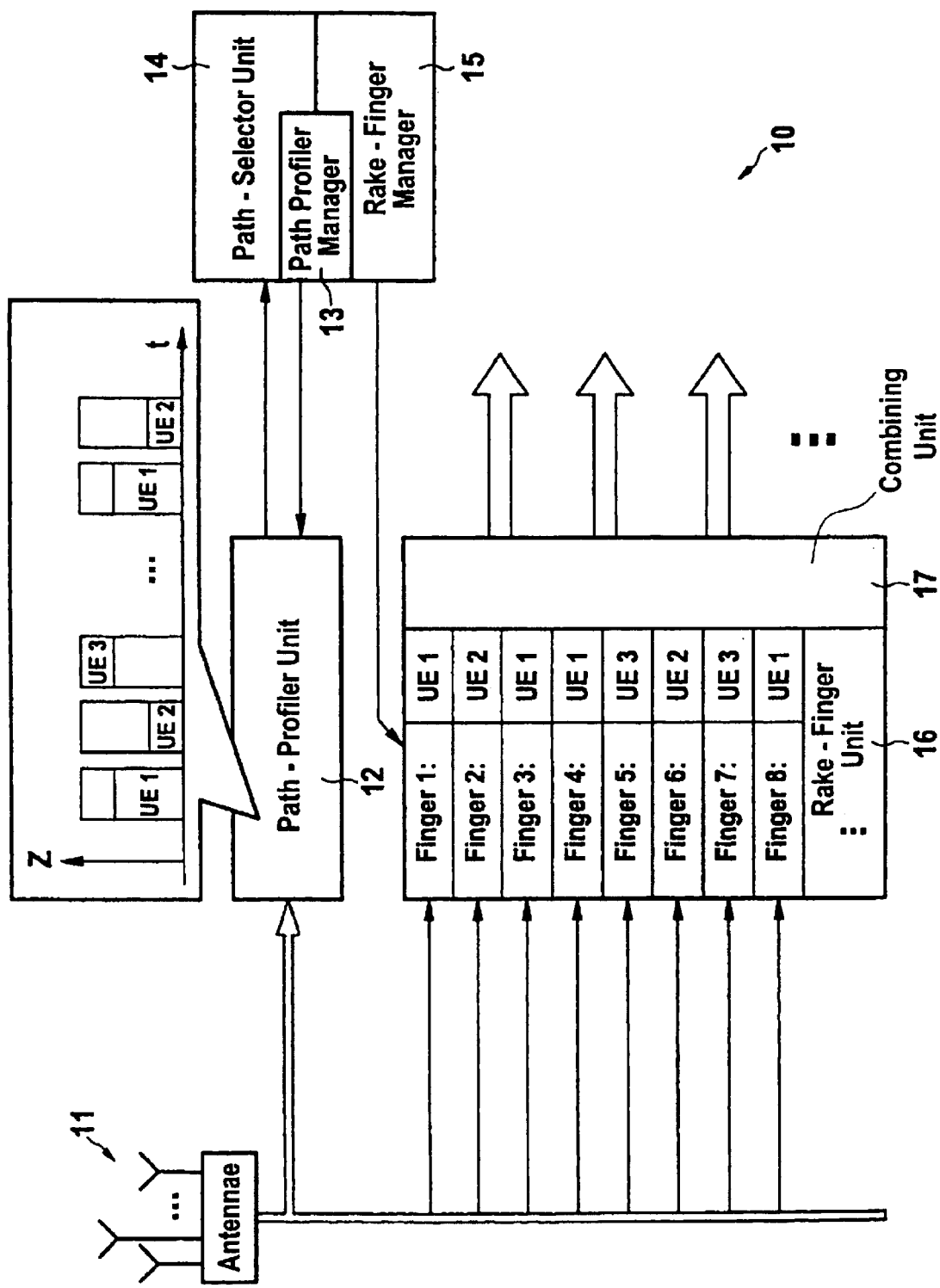

METHOD OF OPERATING A RADIO-BASED COMMUNICATIONS SYSTEM

BACKGROUND OF THE INVENTION

The invention is related to a method of operating a radio-based communications system according to a method of operating a radio-based communications system wherein signals from a plurality of mobile stations are received by a plurality of antennae of a base station, wherein profiles of the received signals are calculated by a plurality of path-profiler-units, wherein specific individual values are selected from the calculated profiles by a path-selector unit, and wherein a plurality of rake-finger-units are assigned to the arrival times of the selected individual values, wherein a predetermined number of path-profiler-units are provided, which are distributed between the plurality of antennae and the plurality of mobile stations with the aid of a path-profiler-manager and a method for operating a radio-based communications system, wherein signals from a plurality of mobile stations are received by a plurality of antennae of a base station, wherein profiles of the received signals are calculated by a plurality of path-profiler-units, wherein specified individual values are selected from the calculated profiles by a path-selector-unit and wherein a plurality of rake-finger-units are assigned to the arrival times of the selected individual values, wherein a predetermined number of rake-finger-units are provided which are distributed with the aid of a rake-finger-manager between the plurality of antennae and the arrival times of the selected individual values.

The invention is based on a priority application DE 101 16 170.0 which is hereby incorporated by reference. The invention further relates to a corresponding radio-based communications system and a corresponding base station therefor.

SUMMARY OF THE INVENTION

A method and a system of this type is known for example from a so-called CDMA communications system (CDMA= code division multiple access) wherein a specified number of so-called path-profilers and a specified number of so-called rake-fingers are kept available for a specified number of mobile stations. The path-profiler is used to search for new signal paths via which the associated mobile station sends signals to the base station. A profile of the received signal consisting of a plurality of individual values is generated by each of the path-profilers. From this profile, those individual values which exceed a predetermined threshold value are each assigned a rake-finger. For each mobile station, the number of path-profilers, as well as the number of rake-fingers, must be selected such that a reliable operation of the communications system is always possible—even in the case of a large number of mobile stations and a large number of obstructions in the local area of the associated base station. This necessitates a large outlay, in particular in terms of hardware for the path-profilers and/or rake-fingers, which is only rarely fully utilized in the operation of the communications system.

The object of the invention is to provide a method of the type referred to in the introduction which requires a lower outlay.

This object is achieved by the methods according to claims 1 and 7. The object is likewise achieved by the base stations according to claims 11 and 12 and by the communications system according to claim 15.

In the invention—as in the prior art—the number of path-profilers and/or rake-fingers is fixed. The difference between the invention and the prior art consists in that the provided path-profilers and/or the provided rake-fingers are not permanently assigned to a specific mobile station or antenna but that, in accordance with the invention, they can be flexibly assigned to different mobile stations. Thus in accordance with the invention it is sufficient to provide only approximately 50% to approximately 70% of the path-profilers and/or rake-fingers provided in the prior art. This constitutes a substantial reduction in particular of the hardware outlay. The simultaneously required outlay for the path-profiler-managers and/or rake-finger-managers provided in accordance with the invention is negligible.

Furthermore, due to the flexible assignment of the path-profilers and/or rake-fingers to the mobile stations which are present, it is even possible to assign a larger number of the path-profilers and/or rake-fingers to a specific mobile station compared to the prior art, in each case with fixed numbers thereof. In particular when there are a large number of obstructions in the local area of the base station, this results in the advantage that the signals received in this case by the base station can be better recognised than in the prior art.

The assignment of the provided path-profilers and/or rake-fingers to the various mobile stations can take place in different ways. Thus i.a. it is advantageous for the correlators provided in a path-profiler not to be assigned to the signal of one single mobile station as is usually the case, but for example to be split between two signals in time division multiplex. It is also advantageous for the threshold value which governs the selection of the individual values to be variable as a function of the number of rake-receivers still available. With both measures it can be ensured that the number of provided path-profilers and/or rake-receivers is not exceeded.

BRIEF DESCRIPTION OF THE DRAWINGS

Further features, possible applications and advantages of the invention will be disclosed in the following description of exemplary embodiments of the invention which are illustrated in the drawing. Here all the described or illustrated features, both individually or in any combination, form the subject of the invention, irrespective of their summarization in the claims or their dependencies and irrespective of their wording in the description and representation in the drawing.

The sole FIGURE of the drawing shows a schematic block diagram of an exemplary embodiment of a base station, according to the invention, of a radio-based communications system.

The FIGURE illustrates a base station 10 (also referred to as node B) which is connected to a plurality of antennae 11. With the antennae 11, signals can be received from mobile stations (also referred to as user equipment=UE) situated in the local area of the base station 10. Also provided are a plurality of so-called path-profiler-units 12 which are managed by a so-called path-profiler-manager 13. The path-profiler-units 12 are supplied with the signals received by the antennae 11. A so-called path-selector-unit 14 is acted upon by the path-profiler-units 12 and, in accordance therewith, influences the path-profiler-manager 13 and a so-called rake-finger-manager 15. This rake-finger-manager 15 manages a plurality of so-called rake-finger-units 16. The rake-finger-units 16 are supplied with the signals received by the antennae 11. The signals generated by the rake-finger-units 16 are combined by a combining unit 17 to form a plurality of output signals.

The path-profiler-units can for example have the form of programmable logic circuits, in particular so-called FPGAs (FPGA=field programmable gate array) or ASICs (ASIC application specific integrated circuit). Similar applies to the rake-finger-units 16. The path-profiler-manager 13 can for example have the form of a digital microprocessor, in particular a so-called DSP (DSP=digital signal processor). Similar applies to the rake-finger-manager 15 and to the path-selector-unit 14.

From each of the mobile stations, a plurality of signal paths to the antennae 11 of the base station 10 can be provided. The number and course of the signal paths depends i.a. upon the number and form of obstructions situated in the local area of the base station 10 and/or the relevant mobile station.

Each of the path-profiler-units 12 is provided to detect existing signal paths and signal paths to be newly added. For this purpose each of the path-profiler-units 12 comprises a plurality of correlators which compare the signals, received by the antennae, of the various signal paths with predetermined signals. On the basis of this comparison, each of the path-profiler-units 12 generates a profile of the relevant signal. These profiles are also referred to as power profiles or pulse response profiles or multipath profiles. Each of the profiles is generated for example during a correlation time of 10 milliseconds and consists for example of 192 individual values with a time resolution of 0.13 microseconds. Here a correlator is required for the generation of an individual value. Thus overall this results in a plurality of profiles for the signals of the various signal paths for a specified time period.

By means of the path-profiler-manager 13, the path-profiler-units 12 are arbitrarily assigned to the mobile stations present in the local area of the base station 10 and in each case to one of the antennae 11. This assignment Z of path-profiler-units 12 to mobile stations is likewise schematically illustrated in the FIGURE over the time t.

For a specific antenna and a specific mobile station, the invocation of the correlators of the path-profiler-units 12 is continuously repeated at the shortest possible time intervals. The time interval can be flexibly altered; in particular, the time interval between the repetitions can be increased if a large number of mobile stations are present within the local area of the base station 10 and/or if there are a plurality of signal paths from a mobile station to different antennae.

A specified number of path-profiler-units 12 are available to the path-profiler-manager 13 for distribution between the provided mobile stations. The path-profiler-manager 13 continuously monitors that no more path-profiler units 12 than are provided are distributed. If the specified number of path-profiler-units 12 is reached, the path-profiler-manager 13 implements measures to prevent this number being exceeded.

These measures can for example consist of increasing the time interval between the repetitions of calculations of the profile for a specific mobile station and a specific antenna, in order thus to reduce the number of path-profiler-units 12 required per time period. It is additionally possible to provide that the time interval is different for different mobile stations and/or different antennae.

For each received signal it is also possible to provide only half of the forementioned 192 correlators, thus 96 correlators, in the path-profiler-units 12. This normally results in only a small error as the first half of the generated profile is generally of greater significance than the second half. At the same time however, as a result of this measure the released correlators of the path-profiler-units 12 can be distributed between other received signals.

The profiles for the various signals, generated by the path-profiler-units 12 as a function of the received signals, are fed to the path-selector-unit 14. In dependence upon the obtained profiles and in dependence upon predetermined selection conditions, the path-selector-unit 14 selects specific individual values of the profiles. Normally the selection conditions at least comprise a threshold value which must be exceeded by the individual values of the profiles so that the selected individual values normally are associated with the signals to be most strongly received.

As a function of the selected individual values, the rake-finger-manager 15 then assigns one of the rake-finger-units 16 to each of these individual values. For this purpose the rake-finger-manager 15 obtains information relating to the individual values selected by the path-profiler-selector 14 and to their arrival times. As the path-profiler-selector 14 can select a plurality of individual values within an individual profile, the rake-finger-manager 15 can also assign a plurality of rake-finger-units 16 to an individual profile. Ultimately this means that a plurality of rake-finger-units 16 are assigned to one individual mobile station, as also indicated in the FIGURE.

In the case of a local area comprising a small number of obstructions it is thus possible for each of the mobile stations to be assigned only a small number of rake-finger-units 16, for example only one or two. This small number of rake-finger-units 16 can be used to process the small number of signal paths present due to the small number of obstructions. In this case a relatively large number of mobile stations can be served by the base station 10.

Conversely, in the case of a local area comprising a large number of obstructions, it is possible for each of the mobile stations to be assigned a plurality of rake-finger-units 16. This larger number of rake-finger-units 16 is necessary in order to process the larger number of signal paths present due to the large number of obstructions. In this case not so many mobile stations can be served by the base station 10, which however would also be the case if a larger number of rake-finger-units 16 were provided due to the poor conditions.

Each of the rake-finger-units 16 contains a correlator. The correlator of the rake-finger-unit 16 selected for an individual value is set at this specified individual value. The information required for this purpose, in particular the identification of the mobile station, the identification of the antenna, and the indication of the time conditions, is forwarded from the path-selector unit 14 to the relevant rake-finger-unit 16 via the rake-finger-manager 15.

A specified number of rake-finger-units 16 are available to the rake-finger-manager 15 for distribution between the provided mobile stations. The rake-finger-manager 13 continuously monitors that no more rake-finger-units 16 than are present are distributed. If the specified number of rake-finger-units 16 is reached, the rake-finger-manager 15 implements measures to prevent this number being exceeded. It is possible for the number of still present, unused rake-finger-units 16 to be continuously communicated to the path-selector-unit 14.

These measures can consist for example of changing the selection conditions within the path-selector-unit 14 such that fewer individual values are selected from the generated profiles. Equally, the number of selectable individual values per mobile station can be limited to a maximum number. The maximum number can be dependent upon the number of unused rake-finger-units 16. The selection conditions are thus changed such that the number of individual values never exceeds the number of rake-finger-units 16 which are present. In this way, at the most the maximum number of rake-finger-units 16 present can be provided as selected individual values.

The rake-finger-units 16 and the correlators contained therein process the signals from the mobile stations which are received by the antennae 11. The signals generated by the rake-finger-units 16 are combined by the combining unit 17 in accordance with their association with the various mobile stations. This association is derived from the individual values of a specified profile, which are selected by the path-selector unit 14 and which are themselves assigned the correspondingly associated rake-finger-units 16 via the rake-finger-manager 15. Thus for each mobile station a signal representing a real amplitude value of the relevant mobile station is present at the output of the combining unit 17.

What is claimed is:

1. A method of operating a radio-based communications system wherein signals from a plurality of mobile stations are received by a plurality of antennae of a base station, wherein profiles of the received signals are calculated by a plurality of path-profiler-units, wherein specific individual values are selected from the calculated profiles by a path-selector unit, and wherein a plurality of rake-finger-units are assigned to the arrival times of the selected individual values, wherein a predetermined number of path-profiler-units are provided, which are distributed between the plurality of antennae and the plurality of mobile stations with the aid of a path-profiler-manager.

2. A method according to claim 1, wherein the provided path-profiler-units are distributed with the aid of the path-profiler-manager as a function of the number of mobile stations which are present.

3. A method according to claim 1, wherein the provided path-profiler-units with the aid of the path-profiler-manager are repeated in dependence from the calculation of the profiles of the received signals.

4. A method according to claim 3, wherein the time interval for different mobile stations is selected to be different.

5. A method according to claim 3, wherein the time interval for different antennae is selected to be different.

6. A method according to claim 1, wherein each of the path-profiler-units in each case comprises a specified number of correlators, wherein the number of correlators of each path-profiler-unit is smaller than is actually necessary, that a complete profile is calculated by a plurality of path-profiler-units, and that a sub-profile is calculated by each of the participating path-profiler units, specified sub-profiles in the complete profile preferably being calculated more frequently than other sub-profiles.

7. A method for operating a radio-based communications system, wherein signals from a plurality of mobile stations are received by a plurality of antennae of a base station, wherein profiles of the received signals are calculated by a plurality of path-profiler-units, wherein specified individual values are selected from the calculated profiles by a path-selector-unit and wherein a plurality of rake-finger-units are assigned to the arrival times of the selected individual values, wherein a predetermined number of rake-finger-units are provided which are distributed with the aid of a rake-finger-manager between the plurality of antennae and the arrival times of the selected individual values.

8. A method according to claim 7, wherein the selection of the arrival times and antennae is performed such that the number of provided rake-finger-units is always greater than or equal to the number of selected arrival times and antennae.

9. A method according to claim 7, wherein for the selection of the specified individual values, a threshold value is provided which is changed as a function of the number of provided rake-finger-units.

10. A method according to claim 7, wherein for the selection of the specified individual values, a maximum number is specified for the number of selectable individual values per mobile station, which maximum number in particular is a function of the number of unused rake-finger-units.

11. A base station for a radio-based communications system, with a plurality of antenna with which signals from a plurality of mobile stations can be received, wherein profiles of the received signals can be calculated by a plurality of path-profiler-units, wherein specified individual values can be selected from the calculated profiles by a path selector unit and wherein a plurality of rake-finger-units can be assigned to the arrival times of the selected individual values, wherein a predetermined number of path-profiler-units are provided which can be distributed with the aid of a path-profiler-manager between the plurality of antennae and the plurality of mobile stations.

12. A base station according to claim 11, wherein the path-profiler-units have the form of programmable logic circuits and the path-profiler-manager has the form of a digital microprocessor.

13. A base station according to claim 11, wherein the rake-finger-units have the form of programmable logic circuits and the rake-finger-manager has the form of a digital microprocessor.

14. A radio-based communications system with a base station with a plurality of antenna with which signals from a plurality of mobile stations can be received, wherein profiles of the received signals can be calculated by a plurality of path-profiler-units, wherein specified individual values can be selected from the calculated profiles by a path selector unit and wherein a plurality of rake-finger-units can be assigned to the arrival times of the selected individual values, wherein a predetermined number of path-profiler-units are provided which can be distributed with the aid of a path-profiler-manager between the plurality of antennae and the plurality of mobile stations.

15. A base station for a radio-based communications system, with a plurality of antennae with which signals from a plurality of mobile stations can be received, wherein profiles of the received signals can be calculated by a plurality of path-profiler-units, wherein specified individual values can be selected from the calculated profiles by a path-selector-unit, and wherein a plurality of rake-finger-units can be assigned to the arrival times of the selected individual values, wherein a predetermined number of rake-finger-units are provided, which can be distributed with the aid of a rake-finger-manager between the plurality of antennae and the arrival times of the selected individual values.

16. A base station according to claim 15 wherein the path-profiler-units have the form of programmable logic circuits and the path-profiler-manager has the form of a digital microprocessor.

17. A base station according to claim 16 wherein the rake-finger-units have the form of programmable logic circuits and the rake-finger-manager has the form of a digital microprocessor.

18. A radio-based communications system with a base station with a plurality of antennae with which signals from a plurality of mobile stations can be received, wherein profiles of the received signals can be calculated by a plurality of path-profiler-units, wherein specified individual values can be selected from the calculated profiles by a path-selector-unit, and wherein a plurality of rake-finger-units can be assigned to the arrival times of the selected individual values, wherein a predetermined number of rake-finger-units are provided, which can be distributed with the aid of a rake-finger-manager between the plurality of antennae and the arrival times of the selected individual values.

* * * * *